United States Patent
Kluge

(10) Patent No.: US 12,130,134 B2
(45) Date of Patent: Oct. 29, 2024

(54) CIRCUIT AND METHOD FOR DETERMINING ANGULAR POSITION

(71) Applicant: Melexis Technologies SA, Bevaix (CH)

(72) Inventor: Wolfram Kluge, Dresden (DE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 145 days.

(21) Appl. No.: 17/971,254

(22) Filed: Oct. 21, 2022

(65) Prior Publication Data
US 2023/0128615 A1    Apr. 27, 2023

(30) Foreign Application Priority Data

Oct. 25, 2021  (EP) ..................... 21204597

(51) Int. Cl.
| | | |
|---|---|---|
| *G01B 7/30* | (2006.01) | |
| *G01B 7/14* | (2006.01) | |
| *G01D 5/14* | (2006.01) | |
| *G01D 5/20* | (2006.01) | |
| *G01R 33/00* | (2006.01) | |
| *G01R 33/06* | (2006.01) | |
| *G01R 33/07* | (2006.01) | |
| *G01R 33/09* | (2006.01) | |
| *G06F 15/00* | (2006.01) | |

(52) U.S. Cl.
CPC ...... *G01B 7/30* (2013.01); *G01D 5/20* (2013.01)

(58) Field of Classification Search
CPC ... G01B 7/14; G01B 7/30; G01D 5/14; G01D 5/20; G01R 33/00; G01R 33/06; G01R 33/07; G01R 33/09; G06F 15/00; G06F 19/00
See application file for complete search history.

(56) References Cited

U.S. PATENT DOCUMENTS

| | | |
|---|---|---|
| 7,714,570 B2 | 5/2010 | Thomas et al. |
| 7,911,203 B2 | 3/2011 | Thomas et al. |

(Continued)

FOREIGN PATENT DOCUMENTS

JP    2013253988 A    12/2013

OTHER PUBLICATIONS

Search Report from corresponding European Application No. 21204597.5, Apr. 4, 2022.

*Primary Examiner* — Neel D Shah
(74) *Attorney, Agent, or Firm* — Workman Nydegger

(57) ABSTRACT

A sensor circuit for determining an angular position of a rotating object configured for generating or modulating a magnetic field includes: a first sensor for providing a first sensor signal; a second sensor for providing a second sensor signal a signal correction block for receiving the first/second sensor signal or a signal derived therefrom as a first/second input signal, and for receiving a plurality of feedback signals; and configured for providing a first corrected signal and a second corrected signal; an angle calculation block configured for receiving the first and the second corrected signal, and for determining the angular position signal as a function of a ratio of the first and the second corrected signal; a feedback block configured for receiving the angular position signal, and for generating the plurality of feedback signals based on the angular position signal, with an improved linearity.

18 Claims, 7 Drawing Sheets

(56) References Cited

U.S. PATENT DOCUMENTS

| | | |
|---|---|---|
| 7,994,774 B2 | 8/2011 | Thomas et al. |
| 8,749,227 B2 | 6/2014 | Thomas et al. |
| 2007/0296411 A1 | 12/2007 | Thomas et al. |
| 2010/0181997 A1 | 7/2010 | Thomas et al. |
| 2011/0121825 A1 | 5/2011 | Thomas et al. |
| 2011/0246133 A1* | 10/2011 | Harada ............... G01D 5/145 324/207.14 |
| 2011/0248708 A1 | 10/2011 | Thomas et al. |
| 2012/0095712 A1* | 4/2012 | Komasaki ............ G01D 5/145 702/94 |
| 2014/0070796 A1* | 3/2014 | Reymond ............ G01D 5/145 324/207.2 |
| 2014/0336878 A1 | 11/2014 | Yanai et al. |
| 2017/0248661 A1 | 8/2017 | Blagojevic et al. |
| 2019/0011537 A1 | 1/2019 | Utermoehlen et al. |

\* cited by examiner

CIRCUIT AND METHOD FOR DETERMINING ANGULAR POSITION

FIELD OF THE INVENTION

The present invention relates in general to the field of magnetic sensor devices and method, and more in particular to angular position sensor systems and methods.

BACKGROUND OF THE INVENTION

Angular position sensor systems are known in the art. They offer the advantage of being able to measure an angular position without making physical contact, thus avoiding problems of mechanical wear, scratches, friction, etc.

There are basically two types of magnetic angular position sensor systems: (1) inductive angular position sensor systems, and (2) angular position sensor systems using a permanent magnet.

Inductive angular position sensor systems typically comprise an excitation coil (also known as "transmitter coil") and multiple detection coils (also known as "receiver coils").

In angular position sensor systems using a permanent magnet, the magnet typically generates a magnetic field which is sensed by a plurality of magnetic sensitive elements arranged in a particular manner at a distance from the magnet. The signals from these magnetic sensitive elements are processed in an electronics circuit, and an angular position is determined based on these signals.

The present invention is mainly related to an electronic circuit and a method for determining the angular position based on the sensor signals.

There is always room for improvements or alternatives.

SUMMARY OF THE INVENTION

It is an object of embodiments of the present invention to provide a sensor circuit and a method to determine an actual angular position of a rotating object.

It is an object of embodiments of the present invention to provide a sensor circuit and a method to determine an actual angular position of an object which is rotating at an angular speed in the range from about 4 to about 3200 revolutions per second (mechanical), or from about 20 to about 16000 revolutions per second (electrical).

It is an object of embodiments of the present invention to provide a sensor circuit and a method that provides an accurate (or more accurate) angular position, or that provides an angular position with a small error (or a reduced error) between the output signal and the actual mechanical position.

It is an object of embodiments of the present invention to provide a sensor circuit and a method having an improved linearity between the output signal and the actual mechanical position.

It is an object of particular embodiments of the present invention to provide an inductive angular sensor system having a reduced sensitivity to the presence of unwanted metal parts in the vicinity of the sensor device.

It is an object of particular embodiments of the present invention to provide an angular sensor system and method having an improved robustness to one or more of: temperature variations, mounting requirements (axial offset, radial offset, tilt angle, wobble).

It is an object of embodiments of the present invention to provide such an inductive or magnetic sensor system or circuit or method that is suitable for use in an industrial, robotic or automotive environment.

These objectives are accomplished by embodiments of the present invention.

According to a first aspect, the present invention provides a sensor circuit for determining an angular position of an object when rotating relative to the sensor circuit, wherein the object is configured for generating or modulating a magnetic field, the sensor circuit comprising: a) a first sensor configured for measuring of first characteristic of said magnetic field, and for providing a first sensor signal (e.g. ss1); b) a second sensor configured for measuring of second characteristic of said magnetic field, and for providing a second sensor signal (e.g. ss2); c) a signal correction block configured for receiving the first sensor signal (e.g. ss1) or a signal derived therefrom as a first input signal (e.g. Isig), and for receiving the second sensor signal (e.g. ss2) or a signal derived therefrom as a second input signal (e.g. Qsig), and a plurality of feedback signals (e.g. Idc_c, Qdc_c, Gmm_c); and configured for providing a first corrected signal (e.g. Iadj) having a first amplitude and optionally a first DC value and a second corrected signal (e.g. Qadj) having a second amplitude substantially equal to the first amplitude and optionally a second DC value, and optionally also having a reduced cross-talk; d) an angle calculation block configured for receiving the first and the second corrected signal (e.g. Iadj, Qadj), and for determining said angular position signal (e.g. φ) as a function, e.g. an arctangent function, of a ratio of the first and the second corrected signal (e.g. Iadj, Qadj); e) a feedback block configured for receiving said angular position signal (e.g. φ), and for generating said plurality of feedback signals (e.g. Idc_c, Qdc_c, Gmm_c) based on the angular position signal (e.g. φ), such that the angular position has an improved linearity.

It is an advantage that the angular position is calculated based on a ratio of signals having a substantially same amplitude, because this ratio is independent of the strength of the magnetic field (e.g. independent of the strength of a magnet, e.g. independent of the distance between a sensor device and a magnet, e.g. independent of the amplitude of modulated signals).

It is an advantage that all feedback signals are derived from a single signal (namely said angular position signal), rather than being calculated separately for the first and second signal, because this improves the overall signal consistency, and may improve stability of the feedback loop.

It is an advantage of a closed-loop system, because it is capable of dynamically adjusting itself, depending on the error being introduced. This provides an angular signal value that is more robust against ageing, long-term drift, etc. Another advantage is that a calibration test in which error values are determined, and calibration values are stored in a non-volatile memory (e.g. in the form of a table), as is typically implemented in an open-loop system, can be omitted. Another advantage is that a precise reference angle measurement system, for performing such a test, is not required either.

The first input signal may be a sinusoidal signal having a first amplitude and a first phase.

The second input signal may be a second sinusoidal signal having a second amplitude which may be smaller or larger than the first amplitude, e.g. in the range from 80% to 120% of the first amplitude, and having a second phase which may be offset from the first phase by a value in the range from 80° to 100°.

Preferably, the sensor circuit comprises a semiconductor substrate comprising at least the signal correction block, the angle determination block, the said feedback block. This semiconductor substrate is preferably encapsulated in a ceramic or plastic package (also known as "chip"). Depending on the implementation, the first sensor and the second sensor may also be integrated on this semiconductor substrate, or on a second substrate, for example a printed circuit board (PCB).

In an embodiment, the first sensor and the second sensor are or comprise one or more magnetic sensitive elements, e.g. selected from the group consisting of: horizontal Hall elements, vertical Hall elements, magneto-resistive elements (MR elements). These elements are preferably also integrated on the above-mentioned semiconductor substrate.

In an embodiment, the first sensor and the second sensor are a first and a second receiver coil, implemented on a printed circuit board (PCB). The packaged semiconductor substrate comprising the above-mentioned electronic circuit may be mounted on, e.g. soldered on this PCB.

The first input signal may be a sinusoidal signal having a first amplitude and a first phase;

The second input signal may be a second sinusoidal signal having a second amplitude which may be smaller or larger than the first amplitude, e.g. in the range from 80% to 120% of the first amplitude, and having a second phase which may be offset from the first phase by a value in the range from 80° to 100°.

In an embodiment, the electronic circuit comprises a programmable processor (e.g. a digital signal processor, DSP), comprising or connected to a non-volatile memory, comprising executable instructions for performing at least the signal correction block, the angle determination block, and the feedback block in software.

In an embodiment, the plurality of feedback signals comprise: a first error signal (e.g. Idc_c), a second error signal (e.g. Qdc_c) and a first scaling signal (e.g. Gmm_c); and the signal correction block comprises: i) a first combiner arranged for receiving and combining (e.g. summing or subtracting) the first input signal (e.g. Isig) and a first error signal (e.g. Idc_c), thereby providing a first combined signal (e.g. s1); and ii) a second combiner arranged for receiving and combining (e.g. summing or subtracting) the second input signal (e.g. Qsig) and a second error signal (e.g. Qdc_c), thereby providing a second combined signal (e.g. s2); and iii) a first scaler arranged for scaling the second combined signal (e.g. s2) using the first scaling signal (e.g. Gmm_c) (e.g. by multiplying these signals) thereby providing a third signal (e.g. s3); wherein the first adjusted signal (e.g. Iadj) is the first combined signal (e.g. s1), or is derived from the first combined signal (e.g. s1) and the third signal (e.g. s3); (e.g. as a linear combination thereof); and wherein the second adjusted signal (e.g. Qadj) is the third signal (e.g. s3), or is derived from the first combined signal (e.g. s1) and the third signal (e.g. s3) (e.g. as a linear combination thereof).

Examples of this embodiment are illustrated in FIG. 1 and FIG. 2.

In an embodiment, the plurality of feedback signals further comprises: a second scaling signal (e.g. Gmm2_c); and the signal correction block further comprises: iv) a second scaler arranged for scaling the third signal (e.g. s3) using the second scaling signal (e.g. Gmm2_c) (e.g. by multiplication of these signals); v) a third combiner arranged for combining (e.g. summing or subtracting) an output of the second scaler and the first combined signal (e.g. s1), thereby providing the first adjusted signal (e.g. Iadj); vi) a third scaler arranged for scaling the first combined signal (e.g. s1) using the second scaling signal (e.g. Gmm2_c) (e.g. by multiplication of these signals); vii) a fourth combiner arranged for combining (e.g. summing or subtracting) an output of the third scaler and the third signal (e.g. s3), thereby providing the second adjusted signal (e.g. Qadj).

An example of this embodiment is illustrated in FIG. 2.

It is an advantage of this embodiment that cross-talk between the signals can be reduced or substantially eliminated.

In an embodiment, the plurality of feedback signals comprise: a first error signal (e.g. Idc_c), a second error signal (e.g. Qdc_c) and a first scaling signal (e.g. Gmm_c); and wherein the feedback circuit comprises: α) a derivation block configured for receiving the angular position signal (e.g. φ), and for determining a time-derivative signal of the angular position signal, thereby generating a fourth signal (e.g. s4); β) a DC removal block configured for receiving the fourth signal (e.g. s4) and for removing a DC level of the fourth signal (e.g. s4), (e.g. by high-pass filtering the time-derivative signal), thereby generating a fifth signal (e.g. s5); γ) a plurality of correlators configured for receiving the fifth signal (e.g. s5) and for correlating the fifth signal (e.g. s5) with each of three (optionally clipped) sine and cosine waveforms or patterns, thereby generating three correlation signals (e.g. c1, c2, c3); δ) a plurality of scalers and integrators configured for generating the first error signal (e.g. Idc_c), the second error signal (e.g. Qdc_c), and the first scaling signal (e.g. Gmm_c) by respectively scaling and integrating each of the three correlated signals (e.g. c1, c2, c3).

The optionally clipped sine and cosine waveforms or patterns are synchronous with the angular position signal. The scaling may be applied before or after the integration.

In an embodiment, the plurality of feedback signals further comprises: a second scaling signal (e.g. Gmm2_c); and the feedback circuit is further configured for: ε) correlating the fifth signal (e.g. s5) with a fourth optionally clipped sine waveform or pattern, thereby generating a fourth correlation signal (e.g. c4); ζ) generating the second scaling signal (e.g. Gmm2_c) based on an integration of the fourth correlation signal (e.g. c4).

In an embodiment, the angle calculation block is configured for determining (e.g. calculating) said angular position (e.g. φ) using an arctangent function of a ratio of the first and second corrected signal (e.g. Iadj, Qadj).

For example, using the classical arctangent function, known as arctan( ), or using the two-argument arctangent function, known as arctan 2( ) or atan 2( ). This may be implemented using a look-up table, optionally with interpolation.

According to a second aspect, the present invention also provides an angular position sensor system, comprising: a sensor circuit according to the first aspect; the rotatable object (e.g. a shaft), and a permanent magnet connected to said object.

According to a third aspect, the present invention also provides an angular position sensor system, comprising: a sensor circuit according to the first aspect; a printed circuit board comprising a transmitter coil and at least two receiver coils; the rotatable object, in the form of a conductive target (e.g. a metal target).

This system is an "inductive angular sensor system".

The target may have a C shape or an O-shape.

In an embodiment, the sensor circuit further comprises: a demodulator for demodulating the signals obtained from the three receiver coils; a Clarke transformation block arranged for converting the demodulated signals into said first and second input signal.

This system is an "inductive angular sensor system".

The inductive sensor may be of the C-shape type or the O-shape type.

It is an advantage of converting the three-phase signals into two-phase signals before calculating the angle, because this requires less processing power, and less memory.

According to a fourth aspect, the present invention is also directed to an electrical motor comprising an angular position sensor system according to the second or third aspect.

According to a fifth aspect, the present invention also provides a method of determining an angular position (e.g. φ) of an object rotating relative to the sensor circuit, the object being configured for generating or modulating a magnetic field, the method comprising the steps of: a) measuring a first characteristic of said magnetic field, and providing a first sensor signal (e.g. ss1) or a signal derived therefrom as a first input signal (e.g. Isig); b) measuring a second characteristic of said magnetic field, and providing a second sensor signal (e.g. ss2) or a signal derived therefrom as a second input signal (e.g. Qsig); c) correcting the first and the second input signal (e.g. Isig, Qsig) using a plurality of feedback signals (e.g. Idc_c, Qdc_c, Gmm_c), and providing a first corrected signal (e.g. Iadj) having a first amplitude and a second corrected signal (e.g. Qadj) having a second amplitude substantially equal to the first amplitude (and optionally also having a reduced cross-talk); d) determining (e.g. calculating) said angular position signal (e.g. φ) as a function of the first and the second corrected signal (e.g. Iadj, Qadj); (e.g. an arctangent function of a ratio of these signals); e) generating said plurality of feedback signals (e.g. Idc_c, Qdc_c, Gmm_c) based on the angular position signal (e.g. φ).

In an embodiment, the plurality of feedback signals comprise: a first error signal (e.g. Idc_c), a second error signal (e.g. Qdc_c) and a first scaling signal (e.g. Gmm_c); and step c) comprises: i) combining (e.g. summing or subtracting) the first input signal (e.g. Isig) and the first feedback signal (e.g. Idc_c) yielding a first combined signal (e.g. s1); and ii) combining (e.g. summing or subtracting) the second input signal (e.g. Qsig) and the second feedback signal (e.g. Qdc_c) yielding a second combined signal (e.g. s2); and iii) scaling the second combined signal (e.g. s2) with the first scaling signal (e.g. Gmm_c) yielding a third signal (e.g. s3); iv) providing the first adjusted signal (e.g. Iadj) as the first combined signal (e.g. s1), or as a signal derived from the first combined signal (e.g. s1) and the third signal (e.g. s3); (e.g. as a linear combination thereof); v) providing the second adjusted signal (e.g. Qadj) as the third signal (e.g. s3), or as a signal derived from the first combined signal (e.g. s1) and the third signal (e.g. s3) (e.g. as a linear combination thereof).

Examples of this embodiment are illustrated in FIG. 1 and FIG. 2.

In an embodiment, the plurality of feedback signals further comprises: a second scaling signal (e.g. Gmm2_c), and step c) further comprises: iv) providing the first adjusted signal (e.g. Iadj) as a signal obtained by scaling the third signal (e.g. s3) with the second scaling signal (e.g. Gmm2_c), and by v) combining the resulting signal with the first combined signal (e.g. s1); vi) providing the second adjusted signal (e.g. Qadj) as a signal obtained by scaling the first combined signal (e.g. s1) with the second scaling signal (e.g. Gmm2_c), and by vii) combining the resulting signal with the third signal (e.g. s3).

In an embodiment, the plurality of feedback signals comprise: a first error signal (e.g. Idc_c), a second error signal (e.g. Qdc_c) and a first scaling signal (e.g. Gmm_c); and step e) comprises: α) determining a time-derivative signal of the angular position signal (e.g. φ), thereby generating a fourth signal (e.g. s4); β) removing a DC level from the time-derivative signal (e.g. s4), (e.g. by high-pass filtering the time-derivative signal), thereby generating a fifth signal (e.g. s5); γ) correlating the fifth signal (e.g. s5) with each of three optionally clipped sine and cosine waveforms or patterns, thereby generating three correlation signals (e.g. c1, c2, c3); δ) generating the first error signal (e.g. Idc_c), the second error signal (e.g. Qdc_c), and the first scaling signal (e.g. Gmm_c) by scaling and integrating the correlation signals (e.g. c1, c2, c3).

In an embodiment, the plurality of feedback signals further comprises: a second scaling signal (e.g. Gmm2_c); and step e) further comprises: ε) correlating the fifth signal (e.g. s5) with a fourth optionally clipped sine waveform or pattern, thereby generating a fourth correlation signal (e.g. c4); ζ) generating the second scaling signal (e.g. Gmm2_c) based on an integration of the fourth correlation signal (e.g. c4).

In an embodiment, the angle calculation block is configured for determining (e.g. calculating) said angular position (e.g. φ) using an arctangent function of a ratio of the first and second corrected signal (e.g. Iadj, Qadj).

According to another aspect, the present invention is also directed to a computer program product comprising executable instructions for performing a method according to the fifth aspect, when being executed on a sensor circuit described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
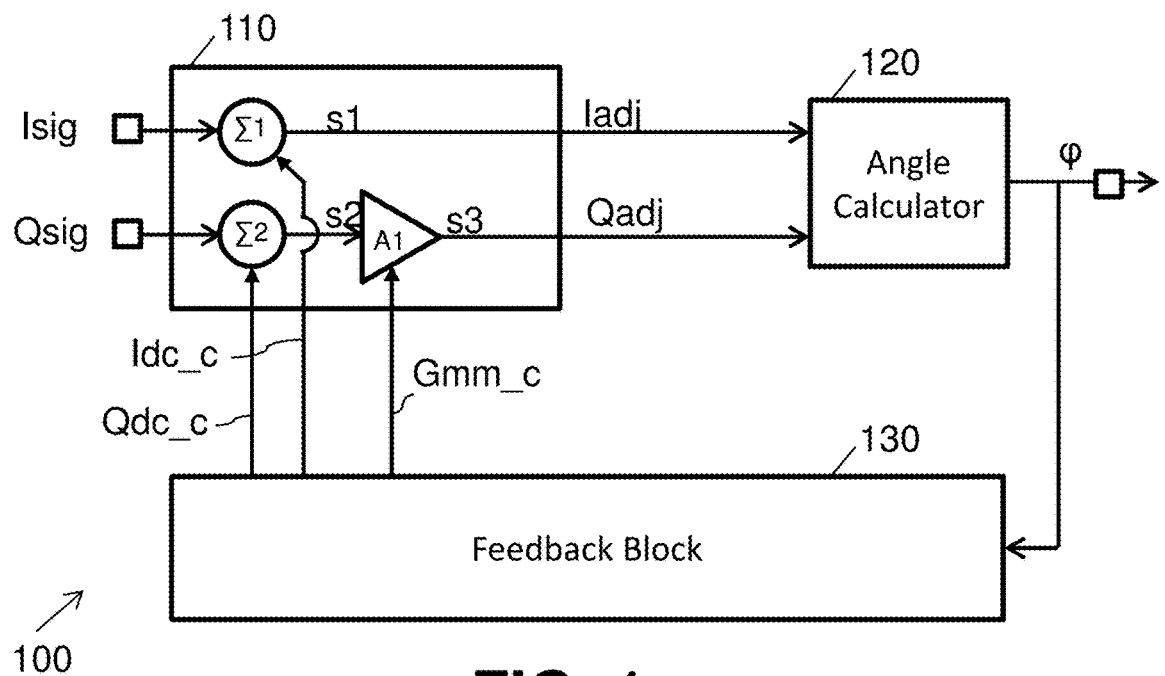
FIG. 1 is a high-level block diagram of a circuit that can be used in embodiments of the present invention. The circuit receives two sinusoidal signals of approximately the same amplitude (with a tolerance margin of ±20%) and approximately 90° phase shift (with a tolerance margin of ±20° and provides an angular position signal. The circuit comprises three main blocks: a signal correction block, an angle calculation block, and a feedback block. The feedback signals are derived from the angular position signal and are injected into the signal correction block which is located upstream of the angle calculation block. This circuit is capable of reducing the influence of signal offset of the input signals, and amplitude variation between the input signals.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same or like reference signs (e.g. same modulo 100) typically refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present invention, the formulas arctan(x/y), atan2(x,y), arccot(y/x) are considered to be equivalent.

In this document, the terms "integrator" and "accumulator" actually mean the same function, but the word "integrator" is typically used when describing an implementation in analog hardware and/or the continuous time domain, whereas the term "accumulator" is typically used when describing an implementation of that function in the discrete time domain, e.g. in digital hardware or in software.

Likewise, the term "scaler" and "multiplier" actually mean the same function.

The present invention relates to angular position sensor systems and methods, and more specifically to systems and methods of calculating an angular position of a rotating object that generates or modulates a magnetic field. The principles of the present invention are applicable to systems comprising a sensor device and a permanent magnet which is rotatable relative to the sensor device, as well as to inductive angular position sensor system.

Referring now to the figures.

FIG. 1 is a high-level block diagram of a circuit 100 that can be used in angular position sensor devices or systems. The circuit 100 receives two sinusoidal signals Isig, Qsig having approximately the same amplitude and being approximately 90° phase shifted relative to one another.

It is known that, if the input signals Isig, Qsig would have exactly the same amplitude and would be exactly 90° phase shifted, they would be referred to as "quadrature signals", and the angular position φ could be easily determined using an arctangent function or using the atan2 function. However, in case the amplitude of the two input signals is not exactly the same, or in case the two signals are not exactly 90° phase shifted, or in case one or both of the two signals are offset from zero, or any combination hereof, the arctangent function will not provide the correct angular position.

In many systems, however, the two input signals Isig, Qsig may not have exactly the same amplitude, but a ratio of the signal amplitudes may be a value in the range from 80% to 120% or from 90% to 110%; and/or the two signals may not be phase shifted by exactly 90°, but by an angle in the range from 80° to 100°, or by an angle in the range from 85° to 95°; and/or two input signals may not have a respective DC value of 0.0, but may be offset by a value in the range from −10% to +10% of their respective amplitude, and the mere application of an arctangent function would provide an incorrect angular position. Various reasons could cause such anomalies. For example, in case of inductive angular position sensors, the layout of the coils may not be perfect, or the rotating target may be tilted relative to the PCB containing the coils, or an unwanted metal object may be present in the location of the PCB, etc. One of the aims of the present invention is to improve the accuracy of the angular position for such systems, especially when the object is rotating at a substantially constant angular speed, in which case the angular output should vary linearly with time, and/or when the object is accelerating at a substantially constant angular acceleration.

The present invention provides a sensor circuit (see e.g. 800 of FIG. 8, or 900 of FIG. 9) for determining an angular position φ of an object (e.g. a permanent magnet 885, or a conductive target 981) when rotating relative to the sensor circuit. The object may be configured for generating or modulating a magnetic field. The sensor circuit 800, 900 comprises:
  a) a first sensor 871, 971 (e.g. a first Hall element, a first MR element, a first receiver coil) configured for measuring of first characteristic of said magnetic field, and for providing a first sensor signal (e.g. ss1 in FIG. 8 or FIG. 9);
  b) a second sensor 872, 972 (e.g. a second Hall element, a second MR element, a second receiver coil) configured for measuring a second characteristic of said magnetic field, and for providing a second sensor signal (e.g. ss2 in FIG. 8 or FIG. 9);
and a processing circuit 860, 960, or 100, 200, 300, 500, 600 showing the processing circuit in more detail.

The processing circuit 100 comprises:
  c) a signal correction block 110 configured for receiving the first and the second sensor signal (e.g. ss1, ss2), or signals derived therefrom (e.g. Isig, Qsig), e.g. after sensitivity correction or after demodulation and/or Clark transformation. The signal correction block 100 is further configured for receiving a plurality of feedback signals (e.g. Idc_c, Qdc_c, Gmm_c), and for providing a first corrected signal Iadj and a second corrected signal Qadj based on the input signals and the feedback signals. The first corrected signal has a first amplitude, and the second corrected signal has a second amplitude substantially equal to the first amplitude. Depending on the implementation, the first and second corrected signal may also have a reduced cross-talk. The processing circuit 100 further comprises:
  d) an angle calculation block 120 configured for receiving the first and the second corrected signal Iadj, Qadj, and configured for determining said angular position signal φ as a function of the first and second corrected signal Iadj, Qadj, e.g. as an arctangent function of a ratio of the first and second corrected signal. The processing circuit 100 further comprises:
  e) a feedback block 130 configured for receiving said angular position signal φ, and for generating said plurality of feedback signals (e.g. Idc_c, Qdc_c, Gmm_c) based on, or derived from the angular position signal φ.

As can be seen from FIG. 1, the processing circuit 100 comprises a closed loop, in which a plurality of feedback signals are derived from a single signal, namely from the angular value, and are fed back into the signal correction block 110 which is situated upstream from the angle calculator block 120. This is completely different from solutions in which an angular value is calculated in an open-loop manner, which value is subsequently corrected in a post-processing circuit.

FIG. 1 shows a block-diagram which may be implemented in hardware (e.g. using analog and/or digital circuitry), or in software, or partly in hardware and partly in software.

In certain embodiments, the "processing circuit" 860, 960 may comprise a programmable processor, e.g. a digital signal processor (DSP), and the functions of the signal correction block 110, and the angle calculator block 120 and the feedback block 130 are performed by software instructions being executed by said programmable processor. Thus, FIG. 1 can also be regarded as a "signal flow diagram" rather than a hardware block diagram.

In the example shown in FIG. 1, the plurality of feedback signals comprise: a first error signal Idc_c, a second error signal Qdc_c, and a first scaling signal Gmm_c, respectively intended for correcting a signal value (e.g. a DC level) and for reshaping the waveform of the first input signal Isig, for correcting a DC value and for reshaping the waveform of the second input signal Qsig, and for correcting an amplitude of the second input signal Qsig. It will be explained further (see e.g. FIG. 3 and FIG. 4) how these signals can be generated.

In the particular implementation shown in FIG. 1, the signal correction block comprises: a first combiner "Σ1" arranged for receiving and combining, e.g. summing or subtracting, the first input signal Isig and the first error signal Idc_c, thereby providing a first combined signal s1; and a second combiner "Σ2" arranged for receiving and combining, e.g. summing or subtracting, the second input signal Qsig and the second error signal Qdc_c, thereby providing a second combined signal s2; and a first scaler "A1" arranged for scaling the second combined signal s2 using the first scaling signal Gmm_c, e.g. by multiplying these signals, thereby providing a third signal s3. As can be seen, in the example of FIG. 1, the first signal s1 and the third signal s3 are input to the angle calculator block 120.

In the processing circuit 100, the angle calculator block 120 is configured for determining an angular position φ as a function of the signals s1, s3. This can be implemented or example by calculating an arctangent function of a ratio of these signals, or by using a look-up table, optionally with interpolation, or in any other suitable way.

In a practical implementation, the combiners Σ1, Σ2 may be implemented as a summation or subtraction block, or a summation or subtraction instruction; and the scaler A1 may be implemented by a multiplier block, e.g. a 16 bit floating point multiplier, or a fixed point multiplier.

Figure 2:
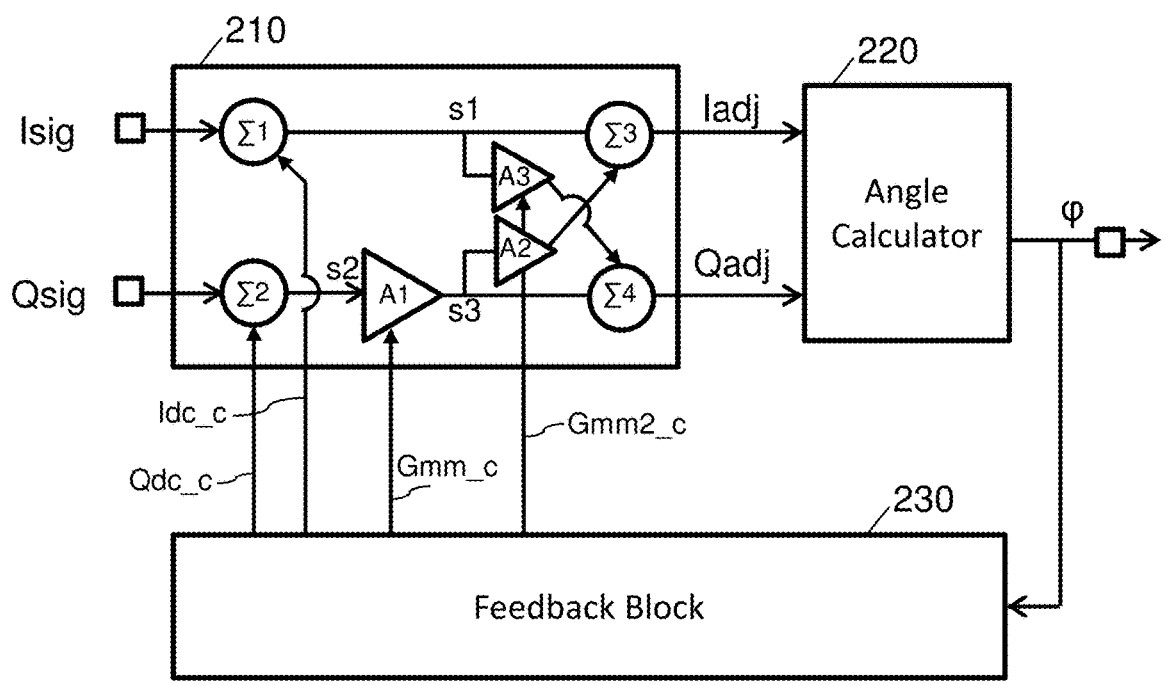
FIG. 2 is a high-level block diagram of another circuit that can be used in embodiments of the present invention, which can be seen as a variant of the circuit of FIG. 1. This circuit is furthermore capable of reducing the effect of cross-talk between the signals.

FIG. 2 is a high-level block diagram of another processing circuit 200 that can be used in embodiments of the present invention. The processing circuit 200 is a variant of the processing circuit 100 of FIG. 1, and everything mentioned above for FIG. 1 is also applicable here, mutatis mutandis. The main difference between the processing circuit 200 of FIG. 2 and the processing circuit 100 of FIG. 1 is that the circuit 200 is furthermore capable of reducing cross-talk between the input signals Isig, Qsig, if present.

Figure 5:
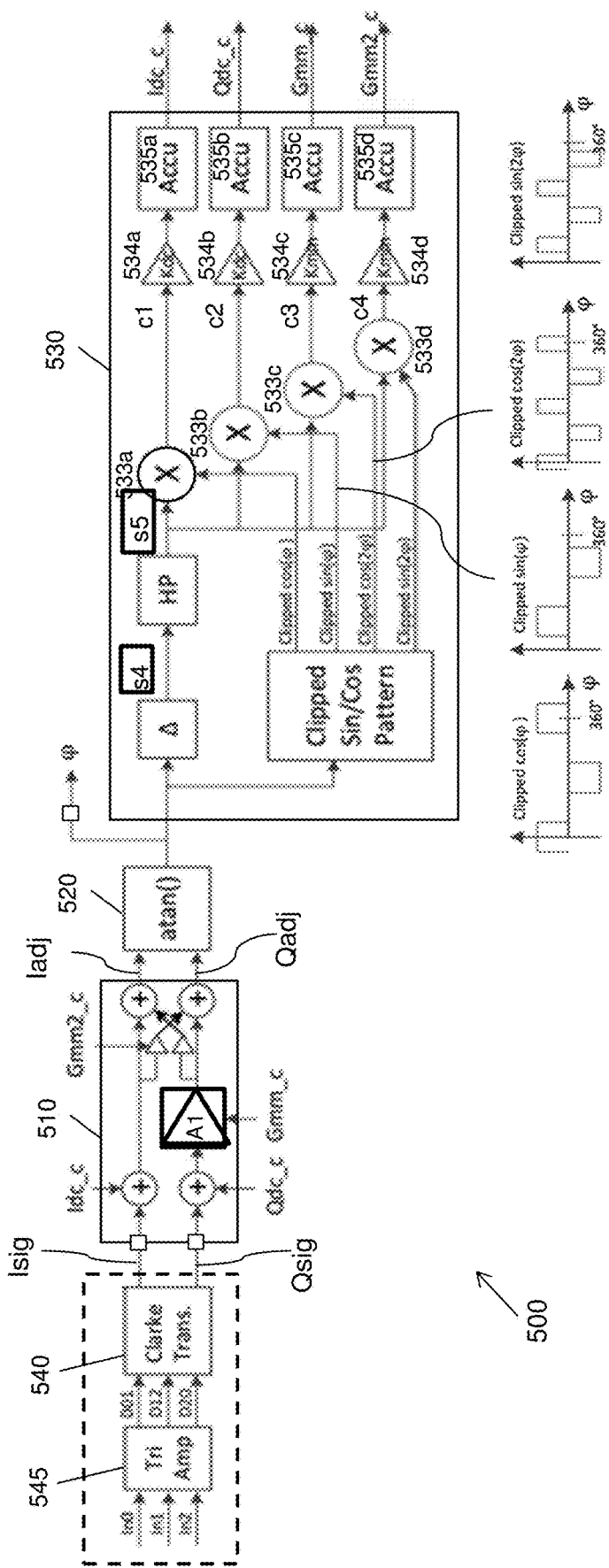
FIG. 5 shows a particular example of the circuit of FIG. 2, showing that the signal correction block may furthermore comprise circuitry for reducing cross-talk between the input signals, and showing that the feedback block provides an additional feedback signal. Optionally, the circuit may also comprise a triple amplifier and a Clarke transformation block.

In the particular implementation of FIG. 2, the plurality of feedback signals further comprises: a second scaling signal Gmm2_c, which may be generated by the feedback block 230 as described in more detail in FIG. 5; and the signal correction block 210 furthermore comprises: a second scaler "A2" arranged for scaling the third signal s3 using the second scaling signal Gmm2_c, e.g. by multiplication of these signals; a third combiner "Σ3" arranged for combining, e.g. by summing or subtracting an output of the second scaler "A2" and the first combined signal s1, thereby providing a first adjusted signal "Iadj"; a third scaler "A3" arranged for scaling the first combined signal s1 using the second scaling signal Gmm2_c, e.g. by multiplication of these signals; and a fourth combiner "Σ4" arranged for combining, e.g. by summing or subtracting, an output of the third scaler "A3" and the third signal s3, thereby providing a second adjusted signal Qadj. One could also say that the signals Iadj and Qadj are generated as a linear combination of the signals s1 and s3.

It is an advantage of this embodiment that cross-talk between the signals can be reduced or substantially eliminated. It was found that this may be particularly interesting in case the input signals Isig and Qsig are derived from three-phase signals using a transformation, e.g. a Clarke transformation, as will be described further in FIG. 5 and FIG. 6.

Figure 3:
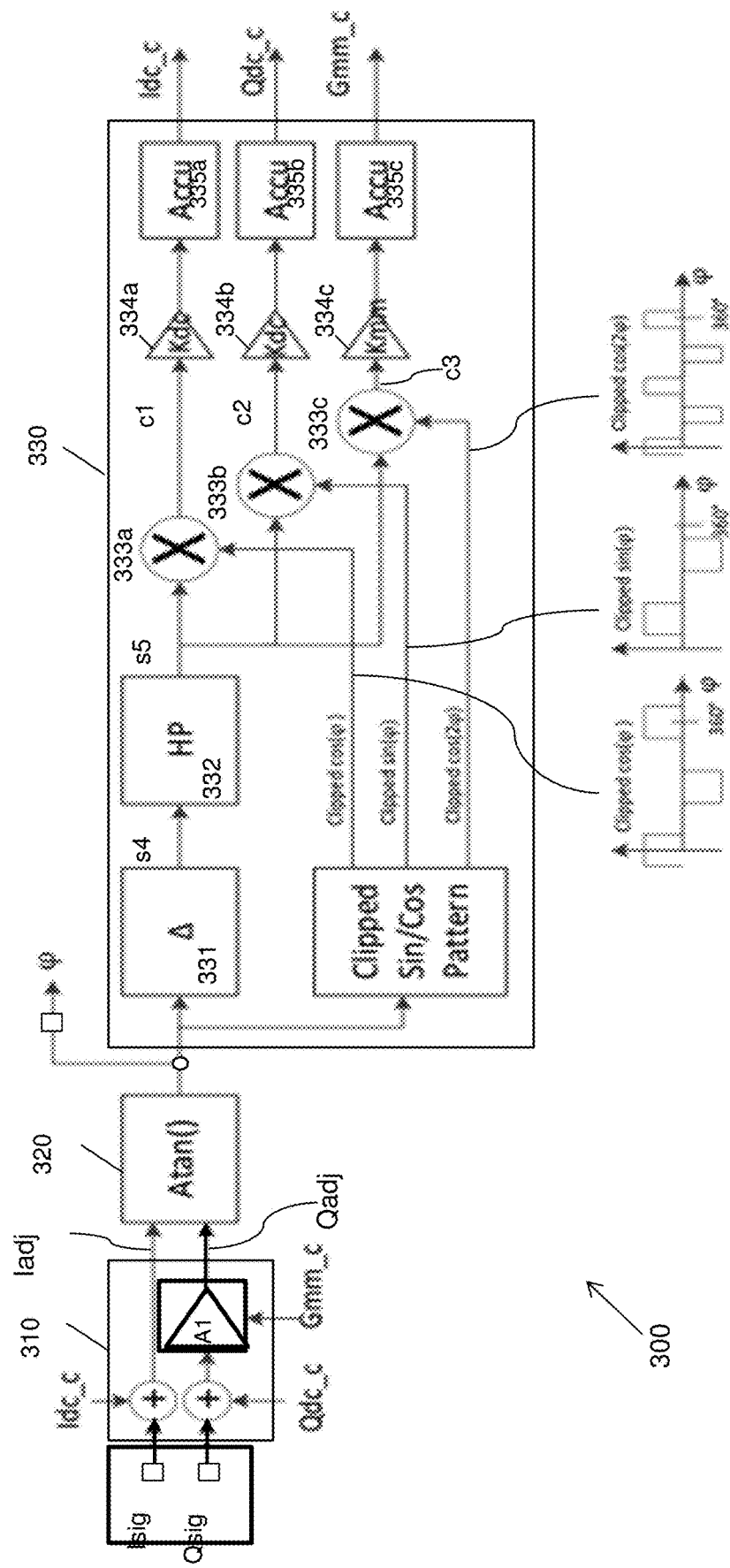
FIG. 3 shows a particular example of the circuit of FIG. 1, showing that the feedback block may comprise a derivation block, a DC removal block, and a plurality of correlators, scalers and integrators.
Figure 4:
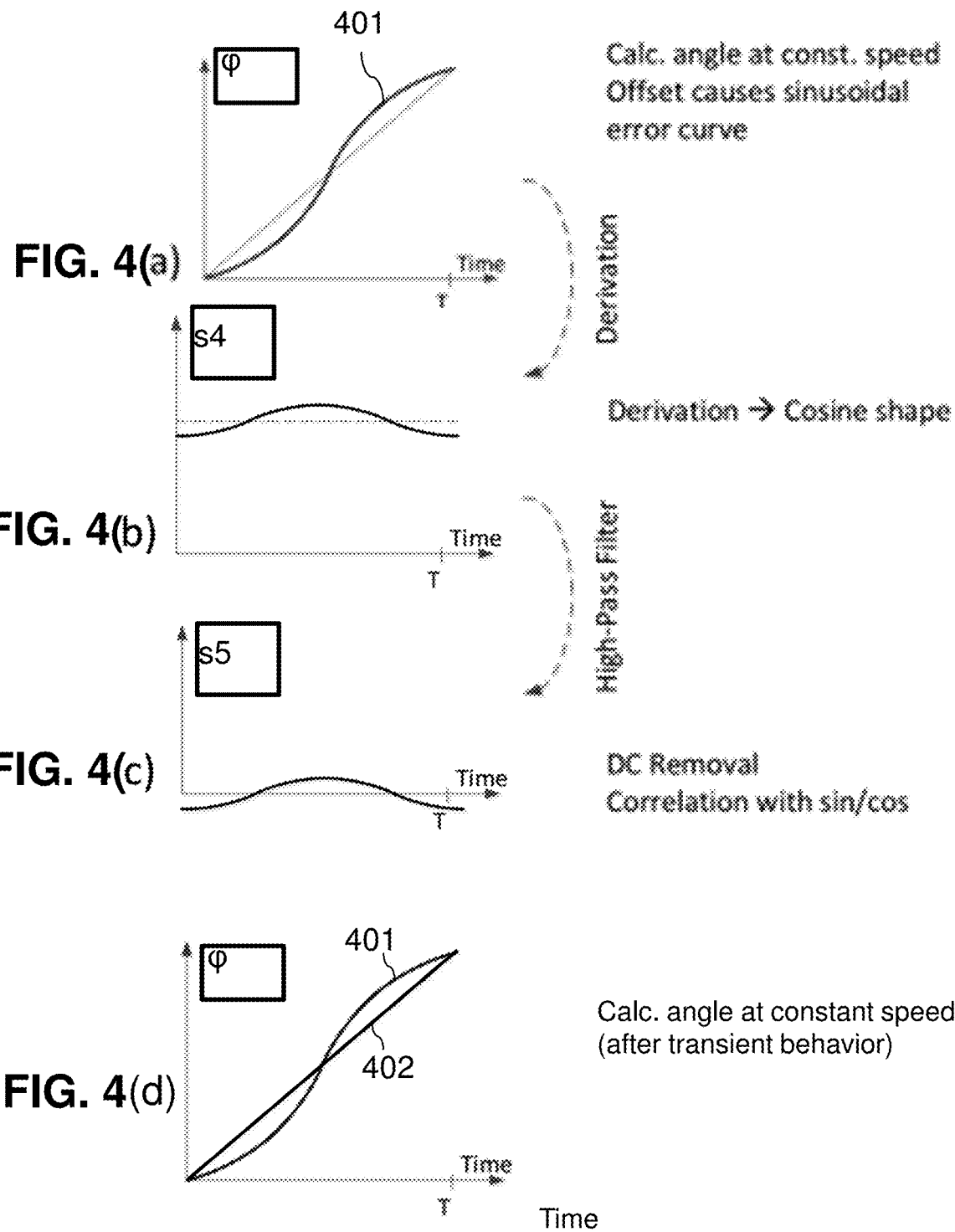
FIG. 4(a) to FIG. 4(d) show illustrative waveforms, to illustrate some of the principles used in the feedback block.

FIG. 3 shows a more detailed version of the circuit of FIG. 1. The signal correction block 310 may be identical to the block 110, and the angle determination block 320 may be identical to the block 120.

The main purpose of FIG. 3 is to show more details about the feedback block 330.

As can be seen, the feedback block 330 comprises a derivation block 331, arranged for receiving the angle signal φ from the angle calculator block 320, and configured for determining a time derivative of the phase φ, and providing this time derivative as a fourth signal s4.

The feedback block 330 further comprises: a DC removal block 332, which may be implemented for example as a high pass filter, but the present invention is not limited hereto, and other techniques may also be used. The DC removal block 332 is configured for receiving the fourth signal s4, for removing a DC component thereof, e.g. by high-pass filtering the signal, and providing the filtered signal as a fifth signal s5.

The feedback block 330 further comprises: a plurality of correlators 333a, 333b, 333c configured for receiving the fifth signal (s5) and for correlating the fifth signal (s5) with each of three optionally clipped sine and cosine waveforms or patterns, thereby generating three correlated signals (c1, c2, c3).

The feedback block 330 further comprises: a plurality of scalers 334a, 334b, 334c and integrators or accumulators 335a, 335b, 335c configured for generating the first error signal Idc_c, the second error signal Qdc_c, and the first scaling signal Gmm_c by respectively scaling and integrating or accumulating each of the three correlated signals c1, c2, c3.

At the bottom of FIG. 3, the waveforms of the optionally clipped sine and cosine waveforms or patterns are shown. The value of these signals is either +1 or 0 or −1, depending on the value of the angle φ. These waveforms or patterns may be stored in a look-up table or may be generated "on-the-fly" using a handful of comparators configured for testing whether the angular value is smaller or larger than the boundaries of the various zones of the waveforms shown in FIG. 3.

For completeness, it is noted that the signals used in the block 330 of FIG. 3 are: clipped cos(φ), clipped sin(φ), clipped cos(2φ). For example, clipped cos(φ) is:
+1 if φ is a value in the range from 0° to 45°, or in the range from 315° to 360°,
0 if φ is a value in the range from 45° to 135°, or in the range from 225° to 315°,
−1 if φ is a value in the range from 135° to 225°, as illustrated.

In other words, for clipped cos(φ), and for clipped sin(φ), the angular range is partitioned in zones of 90° wide; while for clipped cos(2φ) the angular range is partitioned in zones of 45° wide, as illustrated.

It is a major advantage of using clipped sine and cosine signals, because by doing so, the correlators 333a to 333c do not actually need to be multipliers, but it suffices that the accumulator is capable of selectively adding and subtracting signals. This means that the correlators can be implemented by an addition or subtraction rather than a multiplication, which is typically faster and less energy consuming. But the invention will also work when the sine and cosine signals are not clipped.

It was also found that the scalers 334a to 334c do not need to be multipliers, but can be, and preferably are implemented using shift registers, again saving silicon area and/or processing time and/or processing power. As can be seen, the signals c1 and c2 are preferably "multiplied" by a predefined value Kdc, and the signal c3 is preferably "multiplied" by a predefined value Kmm.

The loop gain and also the duration of the settling process are dependent on the factors Kdc and Kmm. A multiplication can be avoided and replaced by a bit-shift operation when choosing the values of Kdc and Kmm as values which can be expressed by $½^N$, $½^M$ respectively, where N and M are integer values.

FIG. 4(a) to FIG. 4(d) show illustrative waveforms, to illustrate some of the principles used in the feedback block 330 of FIG. 3. It is noted that these waveforms are shown as time-continuous waveforms (continuous time), but as already mentioned above, the present invention is not limited thereto, and the processing circuits described in this application can also be implemented in the digital domain (discrete time).

FIG. 4(a) and in particular the curve 401 shows an illustrative example of the angular signal φ as a function of time, assuming the object rotates at a constant speed, and assuming that the input signals Isig and Qsig are not perfect quadrature signals but have one or more of the following shortcomings: a slightly different amplitude, a DC value different from zero, a phase shift slightly different from 90°. The curve 401 shows what the calculated angular signal φ(t) may look like, in case of an open-loop system, or in case the feedback-loop has not yet stabilized. As can be seen, the curve 401 is not perfectly straight, but (in the example) looks like a sine signal superimposed on a straight line.

FIG. 4(b) illustrates how the time-derivative of the angular signal, referred to above as the fourth signal s4, may look like. In the example, the signal s4 looks like a cosine signal superimposed with a constant (i.e. a DC value).

Figure 6:
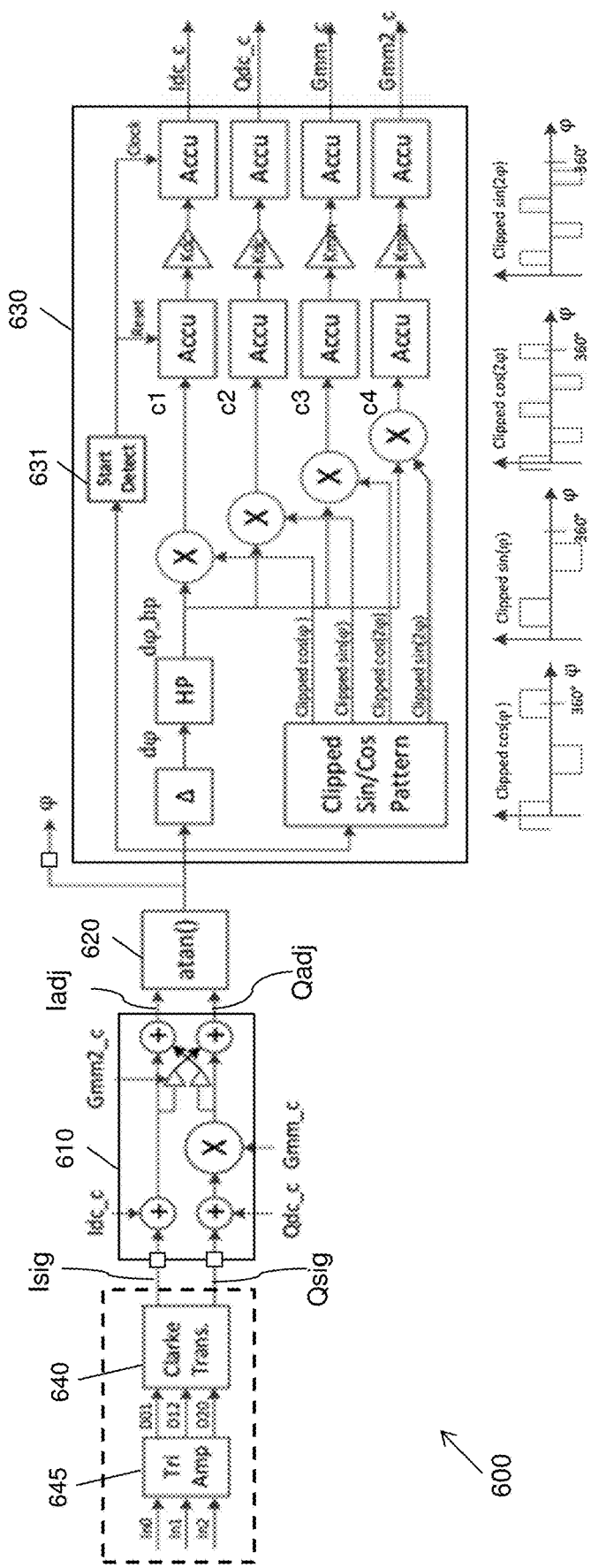
FIG. 6 shows a variant of the circuit of FIG. 5 configured for allowing the correlation to start with a delay, for allowing the high-pass filter to settle.

FIG. 4(c) illustrates how the fifth signal, being the fourth signal s4 after removal of the DC value, e.g. by high-pass filtering, may look like. As described above, this fifth signal s5 is correlated with optionally clipped sine and cosine signals, having waveforms as illustrated at the bottom of FIG. 3 or FIG. 5 or FIG. 6.

The techniques proposed by the present invention are at least partly based on the insight that an offset of the input signals causes a fundamental harmonic in the angular error.

Assuming the object (e.g. magnet or conductive target) is rotating at a constant speed, the loop will stabilize, and the angular signal φ(t) will become "linearized", meaning that the waveform will look more like the line segment 402. Thus, the system with the closed loop system has an improved accuracy, as compared with an open-loop system.

FIG. 5 shows a more detailed version of the circuit of FIG. 2, which can also be regarded as a variant of FIG. 3. The main differences between the processing circuit 500 of FIG. 5 and the processing block 300 of FIG. 3 are the following: the processing block 530 is configured for generating a fourth feedback signal, namely a second scaling signal Gmm2_c, which is fed back to the signal correction block 510, where the signal is used for reducing cross-talk, as described above (see FIG. 2). The feedback signal Gmm2_c is generated by correlating the fifth signal s5 with an optionally clipped sin(2φ) signal, having a waveform as illustrated at the bottom of FIG. 5, thereby forming a fourth correlated signal c4, which is scaled by the scaler 534d using a scaling factor Kmm and integrated (or accumulated) using integrator or accumulator 535d.

Figure 9:
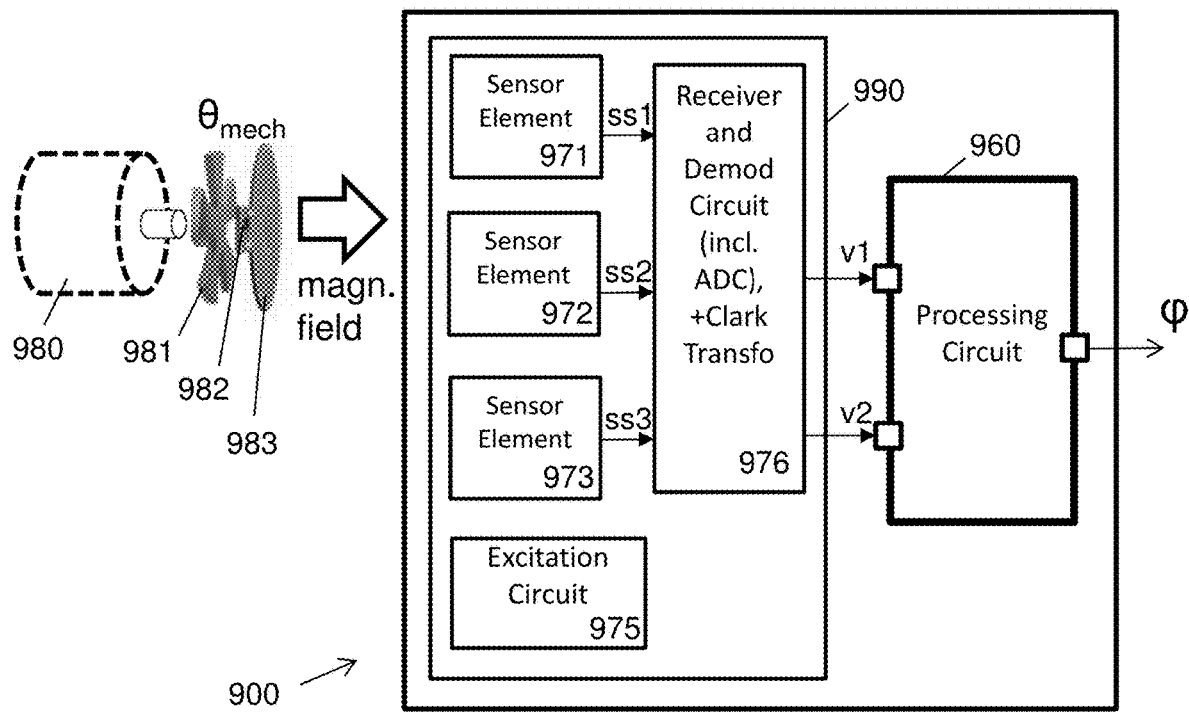
FIG. 9 shows a block-diagram of an angular sensor system comprising a sensor circuit as shown above, and a printed circuit board with a plurality of coils, and a conductive target, which may be mounted to a motor shaft.

In the case of an inductive angular sensor (e.g. as illustrated in FIG. 9), the sensor signals may be three modulated AC signals, which after demodulation result in three sinusoidal signals. Ideally, these signals have exactly the same amplitude, are 120° phase shifted relative to each other, and have a zero DC value. In practice, however, this is only approximately true.

Assuming the demodulated three phase signal are: In0, In1 and In2, then a differential amplifier block 545 may generate the following signals:

$$D01=In0-In1 \quad [1]$$

$$D12=In1-In2 \quad [2]$$

$$D21=In2-In0 \quad [3]$$

wherein In0, In1, In2 are the demodulated signals, and D01, D12 and D21 are difference signals, and a Clarke Transformation block 540 may convert these signals into two signals Isig, Qsig, in accordance with the following formulas:

$$Isig=D01-0.5*(D12+D20) \quad [4]$$

$$Qsig=(D12+D20)*\tfrac{1}{2}\sqrt{3} \quad [5]$$

The blocks 545 and 540 are well known in the art, and may be added upstream of the signal correction block 510, if not already present in the system, e.g. as part of the "Receiver and Demod Circuit" 976 shown in FIG. 9.

FIG. 6 shows a variant of the circuit of FIG. 5, wherein the correlation starts delayed in order to let the high-pass filter settle. Without this delay the correlation with the high-pass setting curve would generate a deviation of the correction values Idc_c, Qdc_c that would increase the error. This error will disappear later but prolongs the overall settling time.

In order to overcome the ripple on the correction value, the amount of filtering of the correlator outputs may be improved by averaging the correlation signal over the period of one electrical rotation. In that way the ripple originating by multiplying the waveform or pattern with a constant dphi value can be completely suppressed. For simplicity, accumulation may be performed over only one period, without the division by the number of samples. This can be implemented for example by addition of a plurality of accumulators, and by a "start detection block" 631 configured to detect a new period, and to generate a "start-detect" signal which is used to reset the first set of accumulators. These accumulators are clocked by the system clock (e.g. once every Tstep=1.3 μs). At the "start of a new period", the second set of accumulators (also referred to as the "Loop filter accumulators") take over the values from the first set of accumulators, so that their value is updated at the time indicated by "start detect" signal every time when a new rotation starts. In this way, error accumulation is avoided.

In other words, the first stage of accumulators (or integrators) averages the correlation results over one electrical rotation. At the end of the rotation, these accumulator values are passed through the gain blocks and to the second stage of accumulators (or integrators). After that, the accumulators (or integrators) of the first stage are reset and start accumulating (or integration) over the next rotation. Thus, the first set of accumulators (or integrators) work at the rate of the incoming phase samples. The second stage of accumulators (or integrators) function as the loop filter for the regulation loop. They are updated at the rate of the start detection, thus only once per (electrical) rotation. This is in contrast to the bock-diagram shown in FIG. 5, where the loop (and the correction values) is updated with the rate of incoming phase samples.

Figure 7:
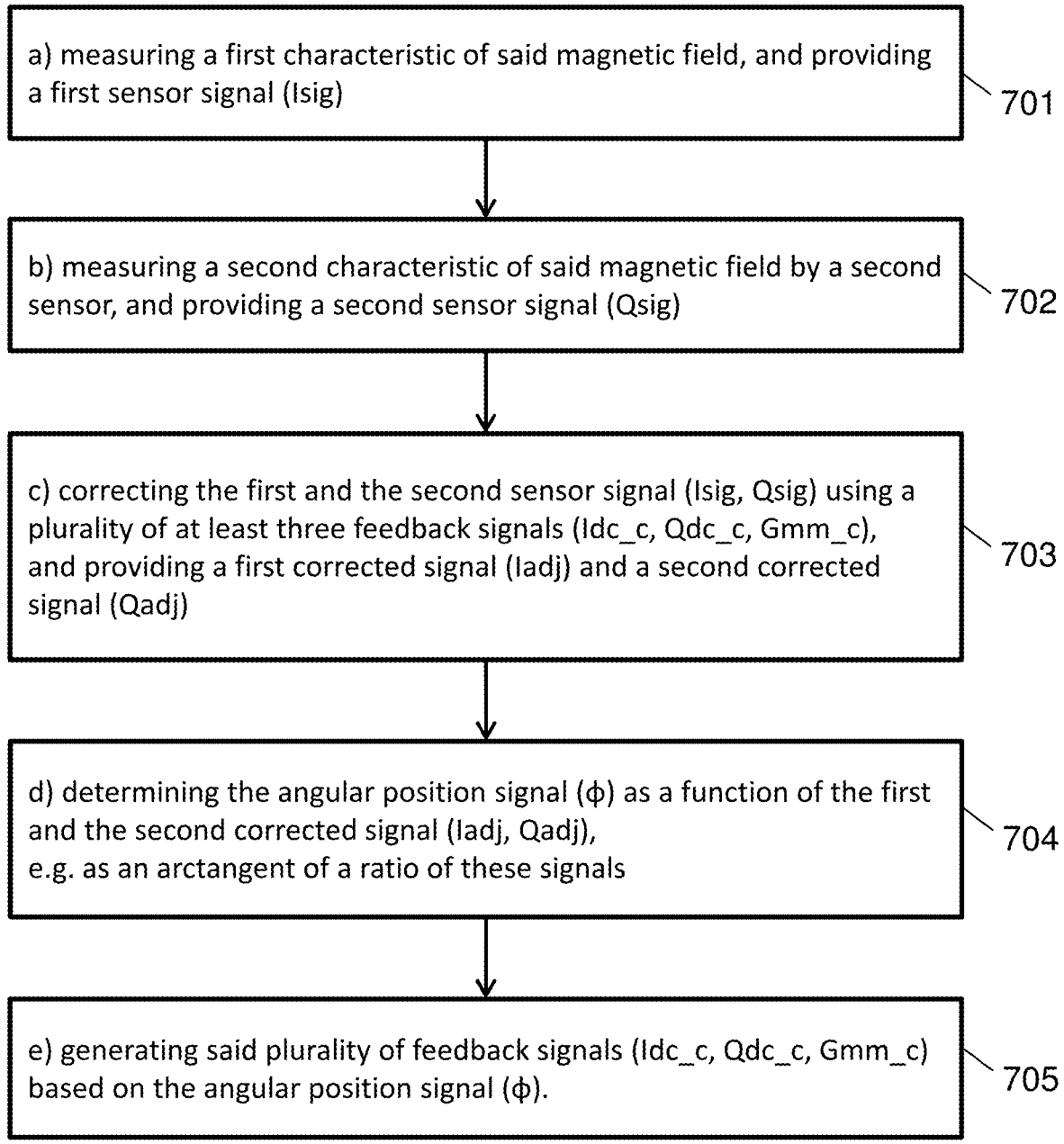
FIG. 7 shows a flow-chart of a method of determining an angular position of a rotating object, based on two sinusoidal signals having substantially the same amplitude (±20%) and being approximately 90° phase shifted)(±20°, as may be performed by any of the circuits of FIG. 1 to FIG. 3, and FIG. 5 to FIG. 6.
Figure 8:
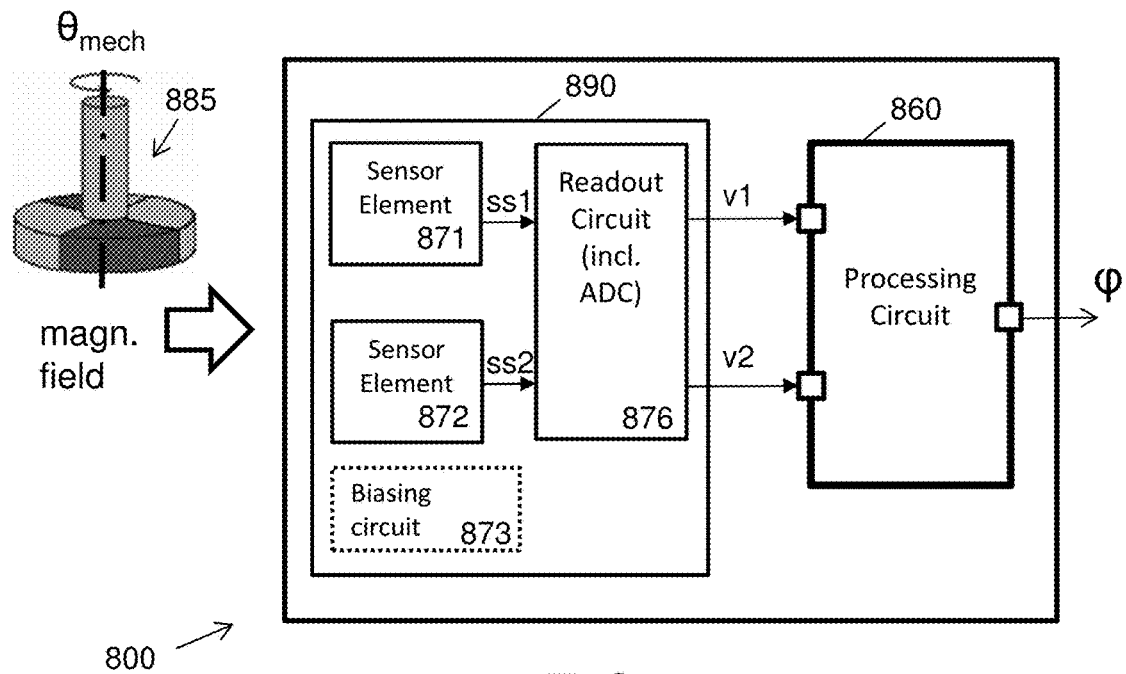
FIG. 8 shows a block-diagram of an angular sensor system comprising a sensor circuit as shown above, and a permanent magnet.

FIG. 7 shows a flow-chart of a method 700 of determining an angular position φ of a rotating object, based on two sinusoidal signals having substantially the same amplitude (deviating at most 20%, or at most 10%, or at most 5%) and being phase shifted by 90°±20°, or by 90°±10°, or by 90°±5°. This method may be performed for a sensor circuit comprising at least two magnetic sensors (e.g. Hall elements, MR elements, receiver coils), and comprising a processing circuit as illustrated in any of FIG. 1 to FIG. 3, or FIG. 5 to FIG. 6. Examples of such sensor circuits are shown in FIG. 8 and FIG. 9.

The method 700 comprises the following steps:
a) measuring 701 a first characteristic of said magnetic field, e.g. a first magnetic field component or a first magnetic field gradient, and providing a first sensor signal ss1 or a signal derived therefrom as a first input signal Isig;
b) measuring 702 a second characteristic of said magnetic field, e.g. a second magnetic field component or a second magnetic field gradient, and providing a second sensor signal ss2 or a signal derived therefrom as a second input signal Qsig;
c) correcting 703 the first and the second input signal Isig, Qsig using a plurality of feedback signals Idc_c, Qdc_c, Gmm_c, and providing a first corrected signal Iadj having a first amplitude, and a second corrected signal Qadj having a second amplitude substantially equal to the first amplitude, and optionally also having a reduced cross-talk;

d) determining 704, e.g. calculating said angular position signal φ as a function of the first and the second corrected signal Iadj, Qadj, e.g. using an arctangent function of a ratio of these signals;

e) generating 705 said plurality of feedback signals Idc_c, Qdc_c, Gmm_c based on the angular position signal φ.

FIG. 8 and FIG. 9 are provided for completeness only. Since all blocks except the processing circuit 860 and 960 are known in the art, a brief description thereof will be sufficient.

FIG. 8 shows an angular sensor system comprising a sensor circuit 800, and a permanent magnet 885 which is rotatable relative to the sensor circuit 800. The sensor circuit 800 is preferably implemented as an integrated semiconductor device (also known as "chip"). The permanent magnet 885 may be a two-pole magnet, or a four-pole magnet, or a magnet comprising more than four poles. The magnet 885 is rotatable about a rotation axis, and the sensor circuit 800 is configured for determining the angular position thereof. Many arrangements of magnetic sensors for measuring a first magnetic signal behaving like a sine-function of the mechanical position, and a second magnetic signal behaving like a cosine function of the mechanical position, are known in the art. The first sensor may for example comprise a first sensor element 871, and the second sensor may for example comprise a second sensor element 872, for example a horizontal Hall element, a vertical Hall element, a magneto-resistive element (MR element), etc. Biasing and readout-circuits for such magnetic sensor elements are well known in the art, and are not the focus of the present invention, and hence do not need to be explained in more detail here. Suffice it to say that Hall elements are typically biased by a current source or a voltage source, and that an MR element is incorporated in a Wheatstone bridge. Relevant for the present invention is that the first sensor provides a first sensor signal ss1, and the second sensor provides a second sensor signal ss2 which behave more or less like a sine and cosine signal, but need not be perfect quadrature signals, as described above. These signals may furthermore be digitized using an analog-to-digital convertor ADC, and provided to the processing circuit 860, where they are further processed as described above. In the system of FIG. 8, the sensors provide a two-phase signal, they are not AM-modulated, and no Clark Transformation is required.

FIG. 9 shows an angular sensor system comprising a sensor circuit 900, comprising three sensors in the form of receiver coils, not explicitly shown, but implemented on a printed circuit board 983, along with a transmitter coil. The transmitter coil and the receiving coils are inductively coupled to one another. The amount of coupling may be influenced by a conductive object 981, also known as "target", rotatably mounted in the vicinity of the transmitter and receiver coils, the angular position of which is to be determined. The target 981 may be connected to a shaft of a motor 980.

In this embodiment, the sensor circuit 900 typically comprises an excitation circuit 975 for injecting an AC current into the transmitter coil, which induces eddy currents in the target 981. The sensor circuit 900 furthermore comprises three magnetic sensors 971, 972, 973 in the form of three receiver coils. The receiving coils will generate AC signals caused by the eddy currents in the target and the current in the transmitting coil. These signals are demodulated in known manners, resulting in three sinusoidal signals, ideally having exactly the same amplitude, having a DC value of exactly zero, and being exactly 120° phase shifted. As mentioned above, in practice, this is only approximately true.

In the block-diagram of FIG. 9, the receiver and demodulator circuit 976 furthermore comprises one or more analog to digital convertors (ADC), and circuitry for performing a Clark transformation, resulting in two signals v1, v2 which are supplied to the processing circuit. Alternatively, as suggested in FIG. 5 and FIG. 6, the Clarke transformation block 540, 640 may be part of the processing circuit 960. Either way, in the sensor circuit 900, the three-phase signals are converted into two-phase signals, which are further processed as described above, e.g. as described in FIG. 2 or FIG. 5 or FIG. 6.

Simulations were performed using a time step of 13 μs, which corresponds to a sampling frequency of about 77 MHz, but of course the present invention is not limited thereto, and other time steps, larger than 13 μs or smaller than 13 μs may also be used, for example a time step in the range from 5 μs to 100 μs, or from 25 μs to 100 μs.

Simulations were performed for a three-phase signal with DC offset and gain mismatch of 10%, and a speed in the range from 20 to 500 revolutions per second mechanical, and with the number of poles equal to 5, not only for the object rotating at constant speed, but also when the speed increases linearly, i.e. constant acceleration. It was found that an offset correction value Kdc=0.0039, and a gain mismatch correction value Kmm=0.0039, in combination with a time step Tstep=13 μs, and a delay of about 52 ms provided a relatively fast settling of the closed loop system after about 100 to 150 ms. As the loop stabilizes, the angular error decreases from about ±10° to a value smaller than ±1° if the speed of the object is constant.

The values of Tstep, Kdc and Kmm are not critical, but the values of Kdc and Kmm are preferably scaled approximately proportionally with Tstep, thus if Tstep is doubled, preferably also Kdc and Kmm are approximately doubled.

The high-pass filter can be implemented for example as an IIR filter (Infinite Impulse Response). Such filters are well known in the art, and hence need not be further explained here.

Simulations showed that the loop remains stable, for an acceleration up to about 1000 rev/s$^2$, or even up to about 2500 rev/s$^2$, or even up to about 5000 rev/s$^2$, or even up to about 7500 rev/s$^2$. A small angular error smaller than about ±2° or about ±0.5° was found during the acceleration, depending on the values of Kdc and Kmm.

Typical values for Kdc and Kmm are: Kdc=Kmm=1;256 (about 0.0039), or Kdc=Kmm=1;512 (about 0.002), or Kdc=Kmm=1;1024 (about 0.001). These values work well for an angular speed in the range from about 4 rev/s to 3200 rev/s (mechanical), with a settling time smaller than about 0.5 s, corresponding to 10 electrical rev, and with an acceleration up to 8000 rev/s$^2$ over 2 s. It is noted, however, that the values of Kdc and Kmm do not need to be the same value but may be different.

The invention claimed is:

1. A sensor circuit for determining an angular position of an object when rotating relative to the sensor circuit, wherein the object is configured for generating or modulating a magnetic field, the sensor circuit comprising:
   a) a first sensor configured for measuring of first characteristic of said magnetic field, and for providing a first sensor signal;
   b) a second sensor configured for measuring of second characteristic of said magnetic field, and for providing a second sensor signal;

c) a signal correction block configured for receiving the first sensor signal or a signal derived therefrom as a first input signal, and for receiving the second sensor signal or a signal derived therefrom as a second input signal, and a plurality of feedback signals; and configured for providing a first corrected signal having a first amplitude, and a second corrected signal having a second amplitude substantially equal to the first amplitude;

d) an angle calculation block configured for receiving the first and the second corrected signal, and for determining said angular position signal as a function of a ratio of the first and the second corrected signal;

e) a feedback block configured for receiving said angular position signal, and for generating said plurality of feedback signals based on the angular position signal, such that the angular position has an improved linearity;

wherein the plurality of feedback signals comprise: a first error signal, a second error signal and a first scaling signal;

wherein the signal correction block comprises:

i) a first combiner arranged for receiving and combining the first input signal and a first error signal, thereby providing a first combined signal; and ii) a second combiner arranged for receiving and combining the second input signal and a second error signal, thereby providing a second combined signal; and iii) a first scaler arranged for scaling the second combined signal using the first scaling signal thereby providing a third signal;

wherein the first adjusted signal is the first combined signal, or is derived from the first combined signal and the third signal; and wherein the second adjusted signal is the third signal, or is derived from the first combined signal and the third signal.

2. The sensor circuit according to claim 1, wherein the plurality of feedback signals further comprises: a second scaling signal; and wherein the signal correction block further comprises:

iv) a second scaler arranged for scaling the third signal using the second scaling signal;

v) a third combiner arranged for combining an output of the second scaler and the first combined signal, thereby providing the first adjusted signal;

vi) a third scaler arranged for scaling the first combined signal using the second scaling signal;

vii) a fourth combiner arranged for combining an output of the third scaler and the third signal, thereby providing the second adjusted signal.

3. The sensor circuit according to claim 1, wherein the feedback block comprises:

α) a derivation block configured for receiving the angular position signal, and for determining a time-derivative signal of the angular position signal, thereby generating a fourth signal;

β) a DC removal block configured for receiving the fourth signal and for removing a DC level of the fourth signal, thereby generating a fifth signal;

γ) a plurality of correlators configured for receiving the fifth signal and for correlating the fifth signal with each of three optionally clipped sine and cosine waveforms or patterns, thereby generating three correlation signals;

δ) plurality of scalers and integrators configured for generating the first error signal, the second error signal, and the first scaling signal by respectively scaling and integrating each of the three correlated signals.

4. The sensor circuit according to claim 3, wherein the plurality of feedback signals further comprises: a second scaling signal; and wherein the feedback block is further configured for:

ε) correlating the fifth signal with a fourth optionally clipped sine waveform or pattern, thereby generating a fourth correlation signal;

ζ) generating the second scaling signal based on an integration of the fourth correlation signal.

5. The sensor circuit according to claim 1, wherein the angle calculation block is configured for determining said angular position using an arctangent function of a ratio of the first and second corrected signal.

6. An angular position sensor system, comprising:
a sensor circuit according to claim 1;
the rotatable object, and a permanent magnet connected to said object.

7. An angular position sensor system, comprising:
a sensor circuit according to claim 1;
a printed circuit board comprising a transmitter coil and at least two receiver coils;
the rotatable object, in the form of a conductive target.

8. The sensor circuit according to claim 1, wherein the sensor circuit further comprises:
a demodulator for demodulating signals obtained from receiver coils;
a Clarke transformation block arranged for converting the demodulated signals into said first and second input signal.

9. A method of determining an angular position of an object rotating relative to the sensor circuit, the object being configured for generating or modulating a magnetic field, the method comprising the steps of:

a) measuring a first characteristic of said magnetic field, and providing a first sensor signal or a signal derived therefrom as a first input signal;

b) measuring a second characteristic of said magnetic field, and providing a second sensor signal or a signal derived therefrom as a second input signal;

c) correcting the first and the second input signal using a plurality of feedback signals, and providing a first corrected signal having a first amplitude and a second corrected signal having a second amplitude substantially equal to the first amplitude;

d) determining said angular position signal as a function of the first and the second corrected signal;

e) generating said plurality of feedback signals based on the angular position signal;

wherein the plurality of feedback signals comprise: a first error signal, a second error signal and a first scaling signal, and wherein step c) comprises:

i) combining the first input signal and the first feedback signal yielding a first combined signal;

ii) combining the second input signal and the second feedback signal yielding a second combined signal;

iii) scaling the second combined signal with the first scaling signal yielding a third signal;

iv) providing the first adjusted signal as the first combined signal, or as a signal derived from the first combined signal and the third signal;

v) providing the second adjusted signal as the third signal, or as a signal derived from the first combined signal and the third signal.

10. The method according to claim 9, wherein the plurality of feedback signals further comprises: a second scaling signal, and
wherein step c) further comprises:
   iv) providing the first adjusted signal as a signal obtained by scaling the third signal with the second scaling signal, and by v) combining the resulting signal with the first combined signal;
   vi) providing the second adjusted signal as a signal obtained by scaling the first combined signal with the second scaling signal, and by vii) combining the resulting signal with the third signal.

11. The method according to claim 9, wherein step e) comprises:
   α) determining a time-derivative signal of the angular position signal, thereby generating a fourth signal;
   β) removing a DC level from the time-derivative signal, thereby generating a fifth signal;
   γ) correlating the fifth signal with each of three optionally clipped sine and cosine waveforms or patterns, thereby generating three correlation signals;
   δ) Generating the first error signal, the second error signal, and the first scaling signal by scaling and integrating the correlation signals.

12. The method according to claim 11, wherein the plurality of feedback signals further comprises: a second scaling signal; and
wherein step e) further comprises:
   ε) correlating the fifth signal with a fourth optionally clipped sine waveform or pattern, thereby generating a fourth correlation signal;
   ζ) generating the second scaling signal based on an integration of the fourth correlation signal.

13. The method according to claim 9, wherein the angle calculation block is configured for determining said angular position using an arctangent function of a ratio of the first and second corrected signal.

14. A sensor circuit for determining an angular position of an object when rotating relative to the sensor circuit,
wherein the object is configured for generating or modulating a magnetic field, the sensor circuit comprising:
   a) a first sensor configured for measuring of first characteristic of said magnetic field, and for providing a first sensor signal;
   b) a second sensor configured for measuring of second characteristic of said magnetic field, and for providing a second sensor signal;
   c) a signal correction block configured for receiving the first sensor signal or a signal derived therefrom as a first input signal, and for receiving the second sensor signal or a signal derived therefrom as a second input signal, and a plurality of feedback signals; and configured for providing a first corrected signal having a first amplitude, and a second corrected signal having a second amplitude substantially equal to the first amplitude;
   d) an angle calculation block configured for receiving the first and the second corrected signal, and for determining said angular position signal as a function of a ratio of the first and the second corrected signal;
   e) a feedback block configured for receiving said angular position signal, and for generating said plurality of feedback signals based on the angular position signal, such that the angular position has an improved linearity;
wherein the plurality of feedback signals comprise: a first error signal, a second error signal and a first scaling signal; and
wherein the feedback block comprises:
   α) a derivation block configured for receiving the angular position signal, and for determining a time-derivative signal of the angular position signal, thereby generating a fourth signal;
   β) a DC removal block configured for receiving the fourth signal and for removing a DC level of the fourth signal, thereby generating a fifth signal;
   γ) a plurality of correlators configured for receiving the fifth signal and for correlating the fifth signal with each of three optionally clipped sine and cosine waveforms or patterns, thereby generating three correlation signals;
   δ) a plurality of scalers and integrators configured for generating the first error signal, the second error signal, and the first scaling signal by respectively scaling and integrating each of the three correlated signals.

15. The sensor circuit according to claim 14, wherein the plurality of feedback signals further comprises: a second scaling signal; and
wherein the feedback block is further configured for:
   ε) correlating the fifth signal with a fourth optionally clipped sine waveform or pattern, thereby generating a fourth correlation signal;
   ζ) generating the second scaling signal based on an integration of the fourth correlation signal.

16. The sensor circuit according to claim 14, wherein the angle calculation block is configured for determining said angular position using an arctangent function of a ratio of the first and second corrected signal.

17. An angular position sensor system, comprising:
a sensor circuit according to claim 14;
the rotatable object, and a permanent magnet connected to said object.

18. The sensor circuit according to claim 14, wherein the sensor circuit further comprises:
a demodulator for demodulating signals obtained from receiver coils;
a Clarke transformation block arranged for converting the demodulated signals into said first and second input signal.

* * * * *